US009742256B2

(12) United States Patent
Masuzawa et al.

(10) Patent No.: US 9,742,256 B2
(45) Date of Patent: Aug. 22, 2017

(54) ACTUATOR

(71) Applicant: SEIKO Precision Inc., Narashino-shi, Chiba (JP)

(72) Inventors: Koichi Masuzawa, Narashino (JP); Kenichi Kudo, Narashino (JP)

(73) Assignee: SEIKO PRECISION INC., Matsudo-shi, Chiba (JP)

( * ) Notice: Subject to any disclaimer, the term of this patent is extended or adjusted under 35 U.S.C. 154(b) by 229 days.

(21) Appl. No.: 14/732,166

(22) Filed: Jun. 5, 2015

(65) Prior Publication Data

US 2015/0357875 A1     Dec. 10, 2015

(30) Foreign Application Priority Data

Jun. 9, 2014  (JP) ................................ 2014-118586

(51) Int. Cl.
| | |
|---|---|
| *H02K 1/18* | (2006.01) |
| *H02K 37/14* | (2006.01) |
| *H02K 1/14* | (2006.01) |
| *H02K 5/167* | (2006.01) |

(52) U.S. Cl.
CPC .............. *H02K 37/14* (2013.01); *H02K 1/145* (2013.01); *H02K 1/185* (2013.01); *H02K 5/1672* (2013.01)

(58) Field of Classification Search
CPC ............... H02K 3/18; H02K 3/34; H02K 5/16
USPC ......... 310/49.01, 49.09–49.17, 49.23, 49.27, 310/49.34, 49.41, 156.66, 156.69, 156.71, 310/156.73, 257
See application file for complete search history.

(56) References Cited

U.S. PATENT DOCUMENTS

| | | | | |
|---|---|---|---|---|
| 5,121,017 A | * | 6/1992 | Yamamoto | ........... H02K 15/022 29/596 |
| 5,523,634 A | * | 6/1996 | Takahashi | .............. H02K 3/525 310/49.07 |
| 2007/0296294 A1 | * | 12/2007 | Nobe | ...................... F16C 35/02 310/90 |
| 2008/0054764 A1 | * | 3/2008 | Katada | ................... H02K 1/145 310/49.01 |
| 2014/0028134 A1 | | 1/2014 | Yamamoto et al. | |

FOREIGN PATENT DOCUMENTS

JP          01270762 A   * 10/1989

* cited by examiner

*Primary Examiner* — Naishadh Desai
(74) *Attorney, Agent, or Firm* — Brinks Gilson & Lione

(57) ABSTRACT

To provide an actuator in which an unstable movement of a rotor is controlled. An actuator includes a coil, a bobbin around which the coil is wound, a rotor positioned inside the bobbin, a shaft to which the rotor is fixed and which is rotatably supported, a stator including a base portion positioned on one end side of the shaft, outer magnetic pole portions extending from the base portion along the shaft and positioned outside the bobbin and inner magnetic pole portions extending from the base portion along the shaft and positioned between the rotor and the inside of the bobbin, a stator including a base portion positioned on the other end side of the shaft, outer magnetic pole portions extending from the base portion along the shaft and positioned outside the bobbin and inner magnetic pole portions extending from the base portion along the shaft and positioned between the rotor and the inside of the bobbin and a cover positioned between the rotor and the stator and contacting tip portions of the inner magnetic pole portions to regulate the approach of the inner magnetic pole portions to the rotor.

7 Claims, 6 Drawing Sheets

ACTUATOR

RELATED APPLICATIONS

This application claims priority under 35 U.S.C. §119 to Japanese Patent Application No. 2014-118586 filed on Jun. 9, 2014, the entire contents of which is hereby incorporated by reference.

BACKGROUND OF THE INVENTION

1. Field of the Invention

The present invention relates to an actuator.

2. Description of Related Art

An actuator described in JP-A-2013-0183511 (Patent Document 1) includes a stator having an inner magnetic pole portion which faces the rotor.

SUMMARY OF THE INVENTION

However, when the inner magnetic pole portion is positioned too close to the rotor with respect to a desired position due to various reasons, the movement of the rotor may be unstable.

The present invention has been made for solving the above problem, and an object thereof is to provide an actuator in which the unstable movement of the rotor is controlled.

According to an embodiment of the present invention, there is provided an actuator including a coil, a bobbin around which the coil is wound, a rotor positioned inside the bobbin, a shaft to which the rotor is fixed and which is rotatably supported, a first stator having a first base portion positioned on one end side of the shaft, first outer magnetic pole portions extending from the first base portion along the shaft and positioned outside the bobbin and first inner magnetic pole portions extending from the first base portion along the shaft and positioned between the rotor and the inside of the bobbin, a second stator having a second base portion positioned on the other end side of the shaft, second outer magnetic pole portions extending from the second base portion along the shaft and positioned outside the bobbin and second inner magnetic pole portions extending from the second base portion along the shaft and positioned between the rotor and the inside of the bobbin, and a regulating member positioned between the rotor and the second stator and contacting tip portions of the first inner magnetic pole portions to regulate the approach of the first inner magnetic pole portions to the rotor.

It is possible to provide an actuator in which an unstable movement of the rotor is controlled.

DETAILED DESCRIPTION OF THE PREFERRED EMBODIMENT

Figure 1:
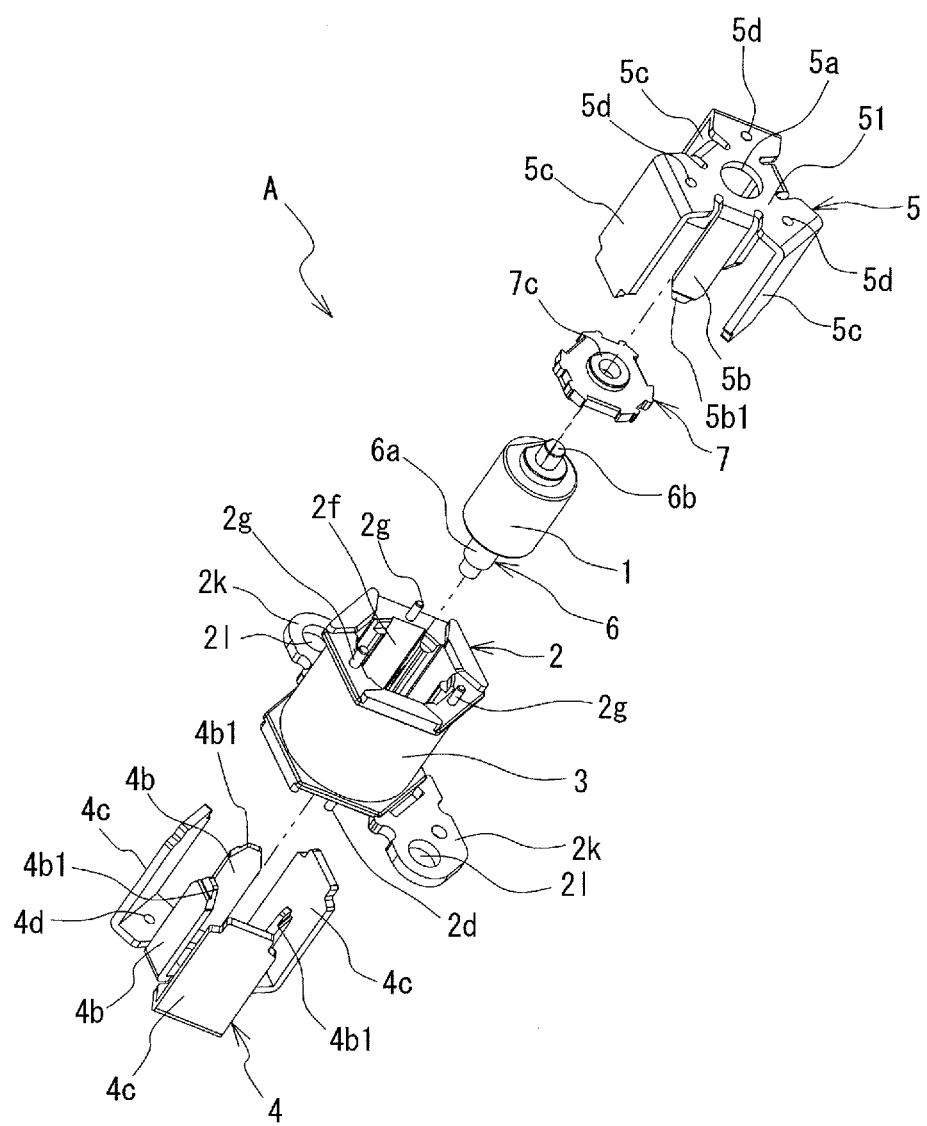
FIG. 1 is an exploded perspective view of an actuator according to an embodiment.
Figure 2:
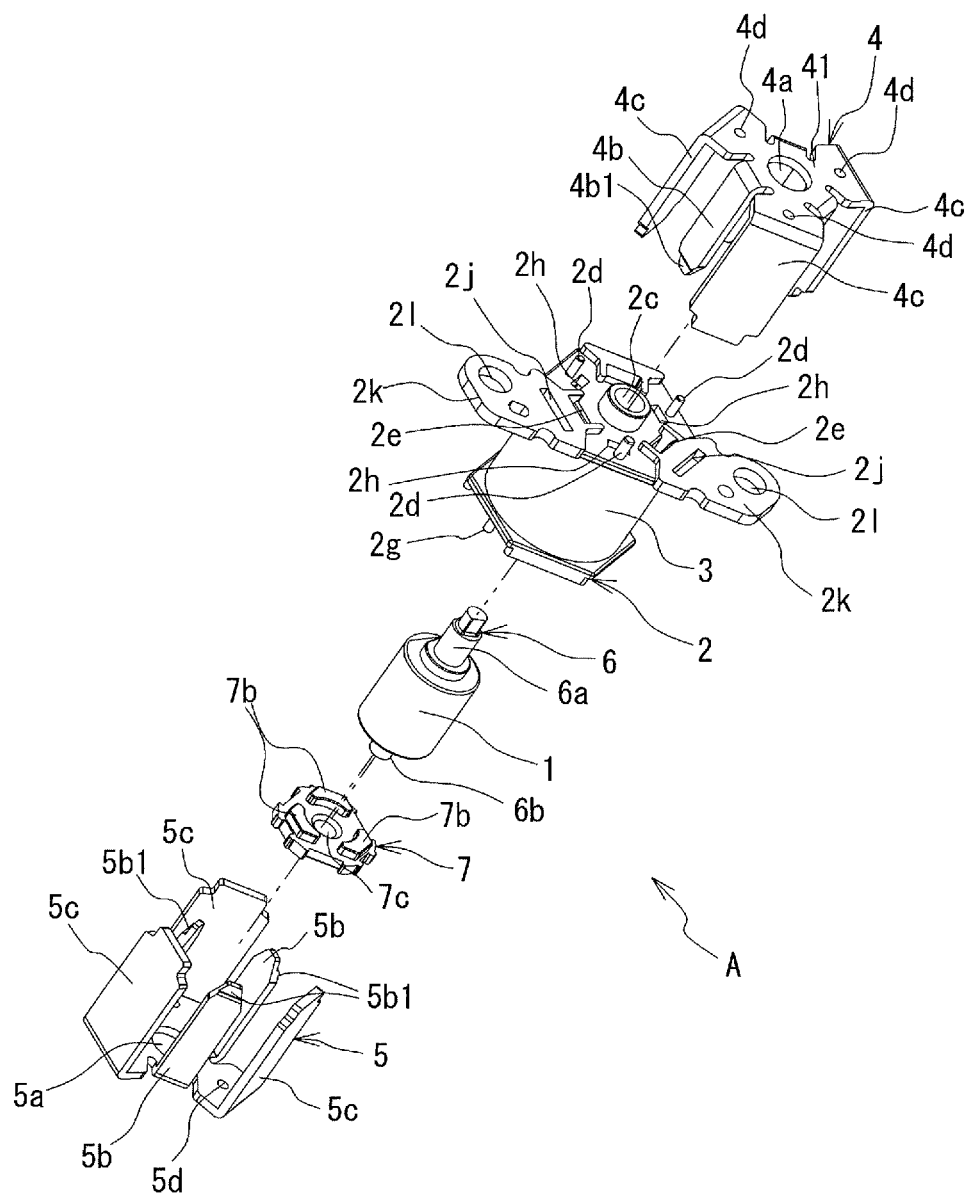
FIG. 2 is an exploded perspective view of the actuator according to the embodiment.
Figure 3:
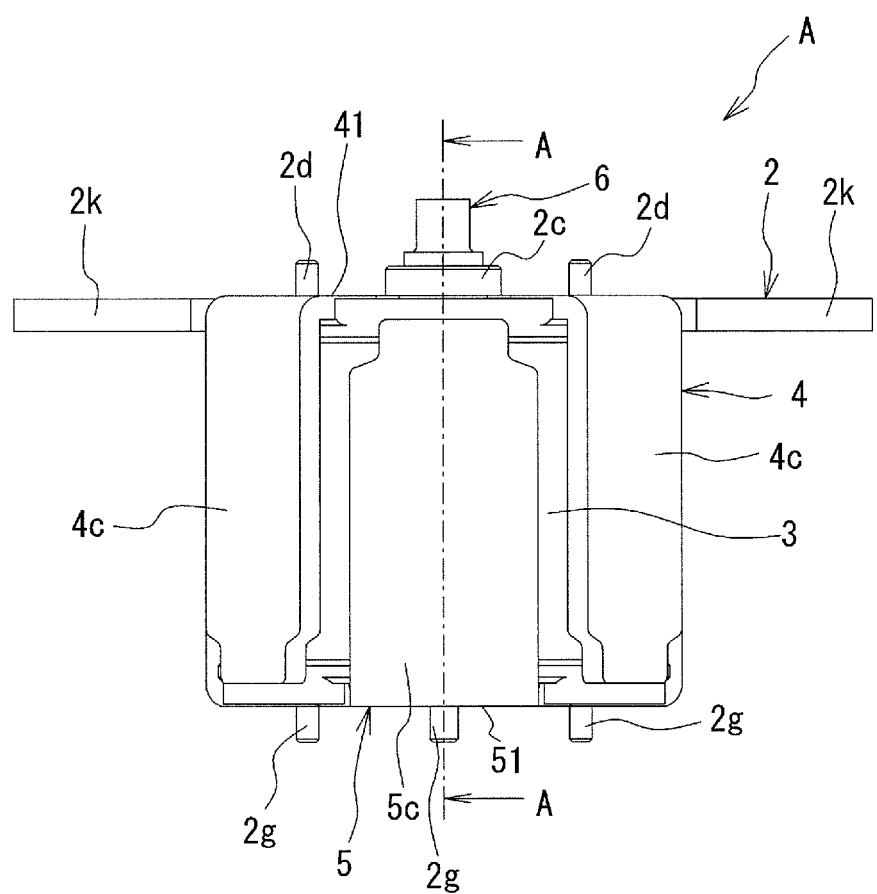
FIG. 3 is an external view of the actuator according to the embodiment.
Figure 4:
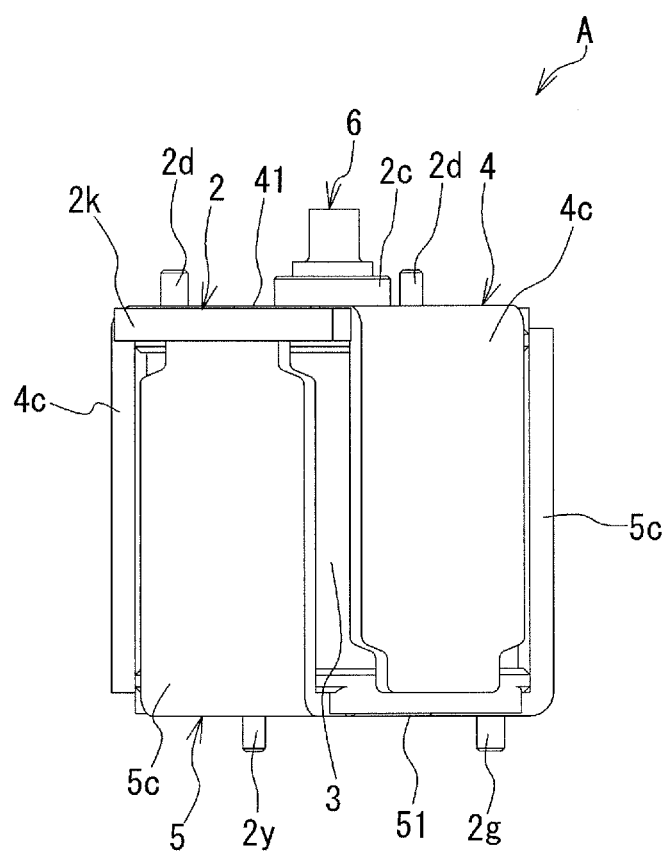
FIG. 4 is an external view of the actuator according to the embodiment.
Figure 5:
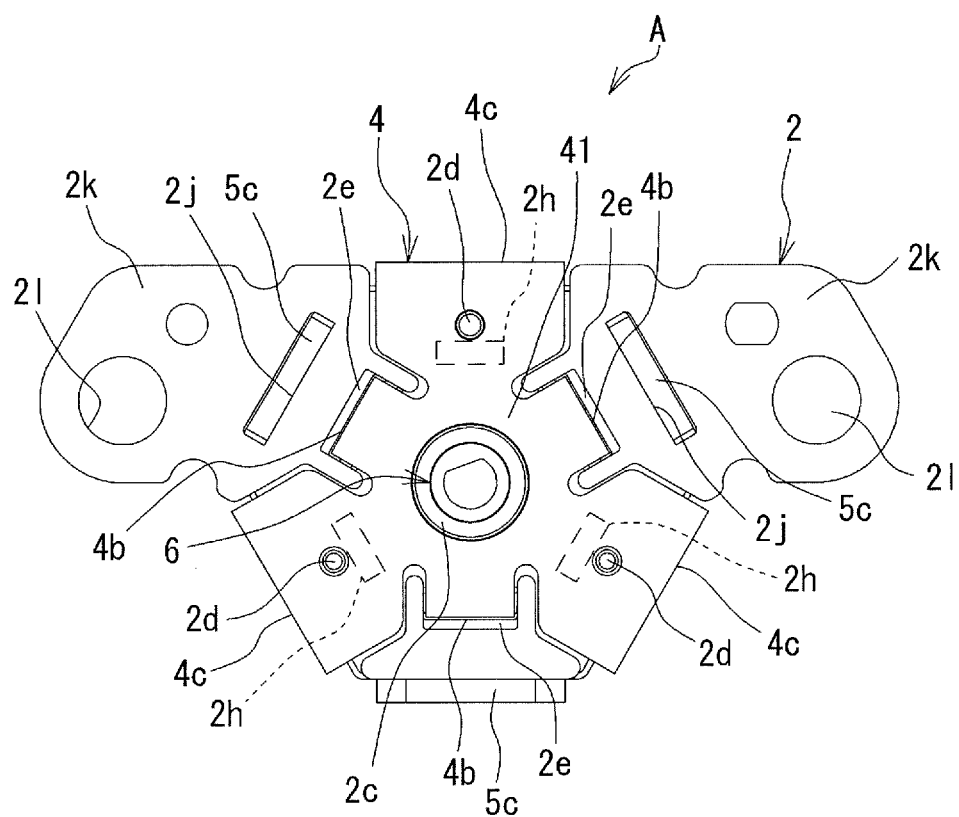
FIG. 5 is an external view of the actuator according to the embodiment.
Figure 6:
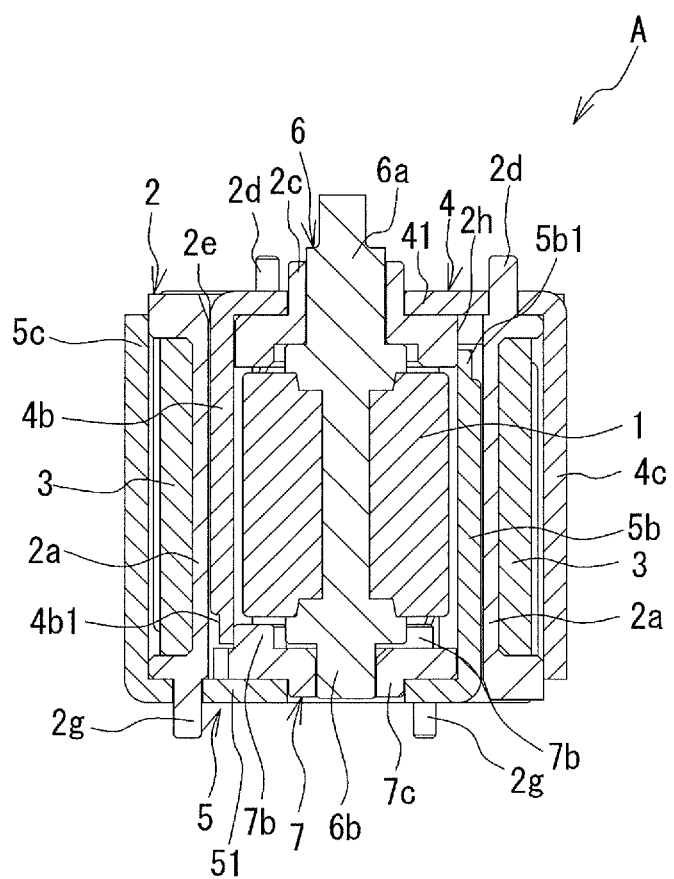
FIG. 6 is an A-A cross sectional view of FIG. 3.

Hereinafter, an embodiment of the present invention will be explained with reference to FIG. 1 to FIG. 6. FIGS. 1 and 2 are exploded perspective views of an actuator A. FIGS. 3 to 5 are external views of the actuator A. FIG. 6 is an A-A cross-sectional view of FIG. 3.

As shown in FIGS. 1 to 6, the actuator A according to the embodiment includes a rotor 1, a bobbin 2, a coil 3, stators 4, 5 and a shaft 6 and a cover 7.

The rotor 1 is magnetized in a predetermined direction after being molded by using a magnetic material integrally with the shaft 6. The magnetizing direction is normally set so that N-S poles appear on both sides sandwiching the shaft. In the present invention, the number of poles corresponds to the number of stators as described later, and six poles are magnetized in the radial direction.

One end 6a of the shaft 6 is rotatably supported by the bobbin 2 and the other end 6b is rotatably supported by the cover 7. The details are described later.

The bobbin 2 is provided with a winding portion 2a around which a coil 3 is wound and which has a space for fitting the rotor 1 at the center, a bearing portion 2c through which one end 6a of the shaft 6 pierces, plural attachment guide portions 2d and 2g provided with respect to the stator 4 and the stator 5 respectively, holes 2e and 2j into which magnetic pole portions of the stator 4 are inserted and holes 2f and 2h into which magnetic pole portions of the stator 5 are inserted. The bobbin 2 is also provided with two extending portions 2k extending to the outside in the radial direction and holes 2l respectively formed in the extending portions 2k. The holes 2l are used when the actuator A is fixed to another device.

The stator 4 is provided with a base portion 4l positioned on the one end 6a side of the shaft 6 so as to be approximately perpendicular to the shaft 6, an attachment hole 4a into which the bearing portion 2c of the bobbin 2 is fitted, inner magnetic pole portions 4b and outer magnetic pole portions 4c extending outward from the attachment hole 4a by a bending work. Three inner magnetic pole portions 4b and three outer magnetic pole portions 4c are alternately formed, and three guide holes 4d into which the attachment guide portions 2d of the bobbin 2 are fitted are formed. The three inner magnetic pole portions 4b are inserted into the holes 2e of the bobbin 2 and arranged inside the coil 3. The three outer magnetic pole portion 4c are arranged outside the coil 3 which is wound around the bobbin 2.

The stator 5 is provided with a base portion 5l positioned on the other end 6b side of the shaft 6 so as to be approximately perpendicular to the shaft 6, an attachment hole 5a into which a bearing portion 7c of the cover 7 is fitted, inner magnetic pole portions 5b and outer magnetic pole portions 5c extending outward from the attachment hole 5a by a bending work. Three inner magnetic pole portion 5b and three outer magnetic pole portion 5c are alternately formed, and three guide holes 5d into which the attachment guide portions 2g of the bobbin 2 are fitted are formed. The three inner magnetic pole portions 5b are inserted into the hole 2f of the bobbin 2 and arranged inside the coil 3. The three outer magnetic pole portion 5c are arranged outside the coil 3 which is wound around the bobbin 2.

Here, the stator 5 is connected to the bobbin 2 in the direction opposite to the direction in which the stator 4 is connected. The inner magnetic pole portions 4b, 5b and the outer magnetic pole portions 4c, 5c which are formed in stators 4 and 5 are respectively arranged in the same inner circumferential surface and the same outer circumferential surface. Also, in the one end 6*a* side of the shaft 6, a not-shown pinion, a driving member or the like is attached. The stators 4 and 5 are respectively examples of first and second stators. The base portions 4*l* and 5*l* are respectively examples of first and second base portions. The inner magnetic pole portions 4*b* and 5*b* are respectively examples of first and second inner magnetic pole portions. The outer magnetic pole portions 4*c* and 5*c* are respectively examples of first and second outer magnetic pole portions.

Also, the inner magnetic pole portions 4*b* and 5*b* are respectively formed in the stators 4 and 5 and extend toward the inside of the coil 3 along the shaft 6 of the rotor 1 so as to extend radially outward from the center of the original member. Therefore, the inner magnetic pole portions 4*b* and 5*b* can be freely formed without limiting the lengths thereof, so these portions can be made long to achieve the actuator having a reduced size and a high output.

That is, a conventional magnetic pole is formed by drawing an original part extending inward, and the magnetic pole portion is limited in length. On the contrary, in the present invention, this portion can be freely formed, not limited in length. Thus, the magnetic flux generated around the coil 3 can be effectively transmitted to the rotor 1, thereby achieving the actuator having a reduced size and a high output.

Additionally, the inner magnetic pole portions 4*b* and 5*b* can be freely extended in the axial direction, thereby increasing the coil winding number without increasing the size of the coil 3. Furthermore, the output of the actuator can be improved while the ratio of increase in the coil resistance to increase in the winding number is as small as possible. That is, the winding number of the coil can be increased, while the increase in the coil resistance is made as small as possible. Since the amount of the magnetic flux which can be generated is determined by multiplying the coil resistance by the current amount, the configuration is effective for increasing the magnetic flux amount.

Next, an operation method of the actuator configured in the above manner will be explained. When predetermined drive pulse signals are inputted to the coil 3 from a known control circuit, not shown, the magnetic flux generated around the coil 3 excites the inner magnetic pole portions 4*b* and 5*b* of the stators 4 and 5 to have corresponding magnetic polarities in a known manner. Therefore, this exerts on the magnetic poles of the rotor 1 for rotation.

Next, since the inner magnetic pole portions 4*b* and 5*b* of the stators 4 and 5 are excited so as to correspond to a change in the sequential drive pulse signals, the rotor 1 continuously rotates sequentially. When the predetermined drive pulse signals are stopped, the operation of the rotor 1 is stopped. Additionally, when the operation of the rotor 1 is forcibly stopped, a known brake pulse is supplied to the coil 3.

Also, in a case where the rotor 1 is swung in the forward and reverse directions, the drive pulses are sequentially inputted to the coil 3 in the forward and reverse directions. In response to the input signals, the rotor 1 is controlled to swing in the forward and reverse directions.

Such rotating operation and swinging operation of the rotor 1 drive a pinion or a driving member attached in one end 6*a* side of the shaft 6 so as to be converted into predetermined mechanical displacements.

That is, a predetermined mechanism is driven by the rotation or the swinging of the pinion attached in one end 6*a* side of the shaft 6. For example, an image-taking lens barrel of a camera is moved to an image-taking mode, and is further returned to the initial state. In addition, the focus adjustment operation of the image-taking lens of the camera is controlled. Furthermore, it is possible to drive a driving member to open and close shutter blades of the camera, and also to drive aperture blades to control a predetermined exposure value. The actuator A can be thus used for optical devices such as the camera.

The inner magnetic pole portions 4*b* and 5*b* are alternately arranged on the same circumferential surface. The outer magnetic pole portions 4*c* and 5*c* are alternately arranged on the circumferential surface different from the above circumferential surface. Also, the outer magnetic pole portions 4*c* face the inner magnetic pole portions 5*b* through the coil 3 and the bobbin 2, and the outer magnetic pole portions 5*c* also face the inner magnetic pole portions 4*b* through the coil 3 and the bobbin 2. Accordingly, the magnetic path of the magnetic flux is formed into a closed loop in the inner side and the outer side of the coil. Therefore, the loss caused by the leak magnetic flux can be restrained.

Next, the cover 7 will be explained in detail. As shown in FIGS. 1, 2 and 6, the cover 7 is positioned between the stator 5 and the rotor 1. In the center of the cover 7, the bearing portion 7*c* which rotatably supports the other end 6*b* of the shaft 6 is formed. The bearing portion 7*c* has a cylindrical shape piercing the cover 7 and protruding from a surface of the cover 7 on the stator 5 side. Also, three protrusions 7*b* are provided around the bearing portion 7*c* at equal intervals in a surface of the cover 7 on the rotor 1 side as shown in FIG. 2. As shown in FIG. 6, tip portions 4*b*1 of the inner magnetic pole portion 4*b* contact outer surfaces of the protrusions 7*b*. Here, the outer surfaces of the protrusions 7*b* protrude from an outside surface of the rotor 1 to the outside in the radial direction. Accordingly, the inner magnetic pole portions 4*b* are regulated not to be too close to the rotor 1 due to the protrusions 7*b*.

As the positions of the tip portions 4*b*1 of the inner magnetic pole portions 4*b* are regulated as described above, the inner magnetic pole portions 4*b* are regulated and not to be too close to the rotor 1, for example, when the inner magnetic pole portions 4*b* are deformed by a shock or the like added to the actuator A. This can control an unstable rotation of the rotor 1. Moreover, the contact of the inner magnetic pole portions 4*b* to the rotor 1 can be also controlled. The three inner magnetic pole portions 4*b* are regulated not to be too close to the rotor 1 as the tip portions 4*b*1 of the three inner magnetic pole portions 4*b* contact the respective three protrusions 7*b*. The cover 7 is an example of a regulating member. The bearing portion 7*c* is an example of regulating portion-side support portion.

Moreover, the inner magnetic pole portions 4*b* are inserted into the hole 2*f* of the bobbin 2. Accordingly, the tip portions 4*b*1 of the inner magnetic pole portions 4*b* are regulated not to be too close to the rotor 1 due to the cover 7, and are regulated not to be too apart from the rotor 1 due to an inner surface of the bobbin 2. Accordingly, the positions of the inner magnetic pole portions 4*b* can be maintained at desired portions. The unstable rotation of the rotor 1 can be also controlled also according to the above structure.

As shown in FIGS. 2 and 6, tip portions 5*b*1 of the three inner magnetic pole portions 5*b* are respectively inserted into the three holes 2*h* of the bobbin 2. As shown in FIG. 6, the holes 2*h* are positioned in the outer side from the outside surface of the rotor 1 in the radial direction. Accordingly, the inner magnetic pole portions 5*b* are regulated not to be too close to the rotor 1 due to the holes 2*h*. The unstable rotation of the rotor 1 is controlled also according to the above structure. Moreover, the contact of the inner magnetic pole portions 5b to the rotor 1 can be also controlled. The hole 2h is an example of a regulating portion. Though the holes 2h pierce a low wall portion of the bobbin 2, the regulating portion is not limited to this. For example, the regulating portion can be formed to have a groove shape capable of being engaged with the tip portion 5b1 of the inner magnetic pole portions 5b and can be formed so as not to pierce the low wall portion of the bobbin 2.

Moreover, the inner magnetic pole portions 5b are inserted into the hole 2f of the bobbin 2. Accordingly, the tip portions 5b1 of the inner magnetic pole portions 5b are regulated not to be too close to the rotor 1 due to the cover 7, and are regulated not to be too apart from the rotor 1 due to the inner surface of the bobbin 2. Accordingly, the positions of the inner magnetic pole portions 5b can be maintained at desired portions. The unstable rotation of the rotor 1 can be also controlled also according to the above structure.

The cover 7 is fitted to an inner surface of the hole 2f of the bobbin 2, thereby regulating the position of the cover 7 with respect to the bobbin 2 in a direction perpendicular to the shaft 6. Also, the bearing portion 7c of the cover 7 has the cylindrical shape protruding from the surface of the stator 5 side as shown in FIG. 1. As shown in FIG. 6, the position of the stator 5 is regulated with respect to the cover 7 in the direction perpendicular to the shaft 6 by fitting the bearing portion 7c to the attachment hole 5a of the stator 5. The cover 7 regulates the position of the other end 6b of the shaft 6 as well as regulates the position of the stator 5 in this manner. The bearing portion 7c is an example of a positioning portion for positioning the stator 5.

Here, at the time of assembling the stator 5 to the bobbin 2, the three guide portions 2g are respectively inserted into the three guide holes 5d, and the three inner magnetic pole portions 5b are inserted into the hole 2f. As the plural guide portions 2g are respectively inserted into the plural guide holes 5d and the plural inner magnetic pole portions 5b are inserted into the hole 2f as described above, a certain degree of tolerance is set to the guide holes 5d and the inner magnetic pole portions 5b. Accordingly, the assembling property between the stator 5 and the bobbin 2 is secured. However, for example, when the cover 7 is not provided, variations in positions of the stator 5 with respect to the bobbin 2 may be increased due to the tolerance. In this case, for example, when the other end 6b of the shaft 6 is directly supported so as to be rotatable by the attachment hole 5a of the stator 5, the position of the stator 5 with respect to the bobbin 2 may vary and the position of the other end 6b of the shaft 6 with respect to the bobbin 2 may also vary.

In the embodiment, the other end 6b of the shaft 6 is rotatably supported by the cover 7, and the cover 7 is fitted to the inner surface of the hole 2f of the bobbin 2. Here, as the cover 7 is just fitted into the hole 2f of the bobbin 2, the tolerance of the cover 7 is set to be small. That is, variations in the position of the cover 7 with respect to the bobbin 2 are smaller than variations in the position of the stator 5 with respect to the bobbin 2. As the other end 6b of the shaft 6 is rotatably supported by the cover 7 in which variations in the position are controlled, variations in the position of the rotor 1 are controlled.

Also, the bearing portion 7c of the cover 7 is fitted to the attachment hole 5a of the stator 5, therefore, the definitive position of the stator 5 is defined. Here, as the single bearing portion 7c is fitted to the single attachment hole 5a, the tolerance of the attachment hole 5a is set to be small. That is, variations in the position of the stator 5 with respect to the cover 7 are controlled. Variations in the central position of the stator 5 are thus controlled. Accordingly, variations in positions of the inner magnetic pole portions 5b and the outer magnetic pole portions 5c of the stator 5 with respect to the rotor 1 are controlled. The bearing portion 7c is an example of the positioning portion.

Furthermore, one end 6a of the shaft 6 is supported by the bearing portion 2c of the bobbin 2 so as to be slidable and rotatable, and the other end 6b of the shaft 6 are supported by the bearing portion 7c of the cover 7 so as to be slidable and rotatable. Accordingly, the shaft 6 is rotatably supported without contacting the stators 4 and 5. Incidentally, the shaft 6, the bobbin 2 and the cover 7 are made of a synthetic resin. As the members made of the synthetic resin slide one another, it is possible to prevent the members made of the synthetic resin from being scraped as compared with a case where the shaft made of a synthetic resin is supported by the stator made of a metal so as to be slidable and rotatable. This can prevent generation of garbage, reduction of durability and so on. The bearing portion 2c is an example of a bobbin-side support portion.

As shown in FIG. 6, thicknesses of the tip portions 4b1 of the inner magnetic pole portions 4b and the tip portions 5b1 of the inner magnetic pole portions 5b are reduced so as to be separated from an inner side surface of the winding portion 2a of the bobbin 2. For example, when the stator 4 is assembled to the bobbin 2, the inner magnetic pole portions 4b move along the inner surface of the winding portion 2a through the holes 2e of the bobbin 2 and are inserted into the bobbin 2. Similarly, when the stator 5 is assembled to the bobbin 2, the inner magnetic pole portions 5b move along the inner surface of the winding portion 2a inserted into the hole 2f. For example, it is assumed that the inner magnetic pole portions 4b and 5b slightly warp outward before assembling the stators 4 and 5 to the bobbin 2. For example, when the thicknesses of the tip portions of the inner magnetic pole portions 4b and 5b are not reduced, there is a danger that these tip portions contact the inner surface of the winging portion 2a to be scratched at the time of assembling. This may cause the generation of garbage. As the thicknesses of the tip portions 4b1 and 5b1 are reduced so as to be separated from the inner surface of the winding portion 2a in the embodiment, the tip portions 4b1 and 5b1 are controlled not to contact the inner surface of the winging portion 2a even when the inner magnetic pole portions 4b and 5b slightly warp outward. This prevents the inner surface of the winding portion 2a from being scratched. It is sufficient that the thickness of at least one of the tip portions of all the inner magnetic pole portions 4b and 5b is reduced.

The bobbin 2 is provided with two holes 2j into which the tip portions of the outer magnetic pole portions 5c of the stator 5 are inserted. This regulates positions of the outer magnetic pole portions 5c. Also, the dimension, the shape and the material are the same in the stators 4 and 5. As a result, the manufacturing costs are suppressed.

The three inner magnetic pole portions 4b, 5b and the three outer magnetic pole portions 4c, 5c are respectively provided and the number of poles of the rotor 1 is 6 in the above embodiment, however, the structure is not limited to this.

The present invention is not limited to the above embodiment, and various alternations of the embodiment may occur within a scope of technical ideas of the present invention.

What is claimed is:

1. An actuator comprising:
   a coil;
   a bobbin around which the coil is wound;
   a rotor positioned inside the bobbin for rotation inside the bobbin;
   a shaft to which the rotor is fixed and which is supported for rotation with the rotor inside the bobbin;
   a first stator stationary with the bobbin and including (a) a first base portion positioned on one end side of the shaft, (b) first outer magnetic pole portions extending from the first base portion along the shaft towards the other end side of the shaft radially outside the bobbin and (c) first inner magnetic pole portions extending from the first base portion along the shaft towards the other end side of the shaft the rotor and an inner periphery of the bobbin;
   a second stator stationary with the bobbin and including (a) a second base portion positioned on the other end side of the shaft, (b) second outer magnetic pole portions extending from the second base portion along the shaft towards the one end side of the shaft outside the bobbin and (c) second inner magnetic pole portions extending from the second base portion along the shaft towards the one end side of the shaft between the rotor and the inner periphery of the bobbin; and
   a cover positioned stationary with bobbin on the other end side of the shaft and comprising first holding structures configured to engage with tip portions of the first inner magnetic pole portions, respectively, to prevent the first inner magnetic pole portions from bending radially inwardly towards the rotor.

2. The actuator according to claim 1, wherein the bobbin is provided with second holding structures configured to engage with tip portions of the second inner magnetic pole portions to prevent the second inner magnetic pole portions from bending radially inwardly towards the rotor.

3. The actuator according to claim 1, wherein the cover includes a supporting structure configured to support the other end side of the shaft for rotation inside the bobbin.

4. The actuator according to claim 1, wherein the cover includes a positioning structure configured to engage with the second base portion of the second stator to position the second stator.

5. The actuator according to claim 1, wherein the bobbin includes a support cover located on the one end side of the shaft and configured to support the shaft for rotation,
   the shaft, the bobbin and the regulating member are made of a synthetic resin, and
   the shaft is not in contact with the first and second stators.

6. The actuator according to claim 1, wherein a radial thickness of at least one tip portion of each of the first and the second inner magnetic pole portions is reduced so as to avoid contact with the inner periphery of the bobbin.

7. The actuator according to claim 1,
   wherein each of the first inner magnetic pole portions is arranged in radial alignment with one of the second outer magnetic pole portions with the coil and the bobbin interposed between them,
   each of the second inner magnetic pole portions is arranged in radial alignment with one of the first outer magnetic pole portions with the coil and the bobbin interposed between them,
   the first and second outer magnetic pole portions are alternately arranged in a first cylindrical plane outside the bobbin, and
   the first and second inner magnetic pole portions are alternately arranged inside the bobbin in a second cylindrical plane radially smaller than the first cylindrical plane.

* * * * *